United States Patent
Chen et al.

(10) Patent No.: US 11,751,301 B2
(45) Date of Patent: Sep. 5, 2023

(54) LED DRIVING CIRCUIT AND LED LAMP

(71) Applicants: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Jiaxing (CN); Pujiang Sansi Optoelectronic Technology Co. Ltd., Jinhua (CN)

(72) Inventors: Ming Chen, Shanghai (CN); Congyi Lin, Shanghai (CN); Shan Li, Shanghai (CN); Defeng Ni, Shanghai (CN); Lianjie Xue, Shanghai (CN)

(73) Assignees: Shanghai Sansi Electronic Engineering Co, Ltd., Shanghai (CN); Shanghai Sansi Technology Co, Ltd., Shanghai (CN); Jiashan Sansi Optoelectronic Technology Co, Ltd., Zhejiang (CN); Pujiang Sansi Optoelectronic Technology Co, Ltd., Jinhua (CN)

( * ) Notice: Subject to any disclaimer, the term of this patent is extended or adjusted under 35 U.S.C. 154(b) by 0 days.

(21) Appl. No.: 17/681,851

(22) Filed: Feb. 28, 2022

(65) Prior Publication Data
US 2022/0418061 A1    Dec. 29, 2022

(30) Foreign Application Priority Data

Jun. 28, 2021 (CN) .......................... 202121446608.9

(51) Int. Cl.
*H05B 45/18* (2020.01)

(52) U.S. Cl.
CPC .................................... *H05B 45/18* (2020.01)

(58) Field of Classification Search
CPC ........................................................ H05B 45/18
See application file for complete search history.

(56) References Cited

U.S. PATENT DOCUMENTS

2013/0119869 A1*  5/2013  Peng ...................... H05B 41/28
                                                                    315/125

FOREIGN PATENT DOCUMENTS

JP            2006012622 A    *   1/2006
JP            2011165317 A    *   8/2011

OTHER PUBLICATIONS

English translation of JP-2006012622-A, Date published: Jan. 12, 2006, 6 pages (Year: 2006).*

(Continued)

*Primary Examiner* — Daniel D Chang

(57) ABSTRACT

An LED driving circuit and an LED lamp are provided. The driving circuit comprises a power input unit coupled to an input voltage; a voltage conversion unit coupled to the power input unit and converting the input voltage into a conversion voltage; a power output unit coupled to the LED light source; a first thermistor unit connected between the power input unit and the voltage conversion unit; a second thermistor unit connected between the voltage conversion unit and the power output unit, where the second thermistor unit and the conversion voltage generates a driving current passing through the LED light source; where the resistance of the first thermistor unit is positively correlated to its sensed temperature, and the resistance of the second thermistor unit is positively correlated to its sensed temperature to stabilize the driving current.

15 Claims, 4 Drawing Sheets

(56) References Cited

OTHER PUBLICATIONS

English translation of JP-2011165317-A, Date published: Aug. 25, 2011, 8 pages (Year: 2011).*

* cited by examiner

LED DRIVING CIRCUIT AND LED LAMP

CROSS REFERENCE TO RELATED APPLICATION

The present application claims the benefit of priority to Chinese Patent Application No. CN 2021214466089, entitled "LED DRIVING CIRCUIT AND LED LAMP", filed with CNIPA on Jun. 28, 2021, the disclosure of which is incorporated herein by reference in its entirety.

FIELD OF TECHNOLOGY

The present disclosure relates to the field of illumination circuitry, in particular to an LED driving circuit and an LED lamp.

BACKGROUND

LED lamps have been widely used in various lighting scenes. However, in practice, a current passing through an LED light source will fluctuate when input voltages or other internal voltages of a driving circuit of LED lamp fluctuate, which further leads to flicker on the one hand and shortened work life of the LED light source on the other hand.

Although feedback circuits have been used to compensate the current, and capacitors also have been used to mitigate the fluctuation, these methods increase the cost or do not have ideal stabilizing effects on the current.

SUMMARY

The present disclosure provides an LED driving circuit and an LED lamp.

A first aspect of the present disclosure provides an LED driving circuit, including a power input unit that is coupled to an input voltage; a voltage conversion unit that is coupled to the power input unit and converts the input voltage into a conversion voltage; a power output unit that is coupled to an LED light source; a first thermistor unit that is connected between the power input unit and the voltage conversion unit, and coupled to the power input unit and the voltage conversion unit respectively; a second thermistor unit that is connected between the voltage conversion unit and the power output unit, and coupled to the voltage conversion unit and the power output unit respectively, where the second thermistor unit and the conversion voltage generates a driving current passing through the LED light source; where the resistance of the first thermistor unit is positively correlated to its sensed temperature, and the resistance of the second thermistor unit is positively correlated to its sensed temperature to stabilize the value of the driving current.

In an embodiment of the first aspect, the first thermistor unit includes at least one first thermistor element whose resistance is positively correlated to its sensed temperature.

In an embodiment of the first aspect, the first thermistor unit includes a plurality of the first thermistor elements that is connected in series and/or in parallel.

In an embodiment of the first aspect, the first thermistor element is a polymeric positive temperature coefficient thermistor.

In an embodiment of the first aspect, the second thermistor unit includes a combination of resistors, where the combination of resistors includes at least one second thermistor element and thermistor elements or non-thermistor elements that are connected with the second thermistor element in parallel, and the resistance of the second thermistor element is positively correlated to its sensed temperature.

In an embodiment of the first aspect, the second thermistor unit includes a plurality of second thermistor elements that is connected in series and/or in parallel, where the resistance of the second thermistor element is positively correlated to its sensed temperature.

In an embodiment of the first aspect, the second thermistor element in the second thermistor unit is a ceramic positive temperature coefficient thermistor.

In an embodiment of the first aspect, the voltage conversion unit includes a rectifier circuit, or, a transformer circuit that is connected to a rectifier circuit.

In an embodiment of the first aspect, the input voltage is an alternating current voltage, and the voltage conversion unit includes the rectifier circuit.

In an embodiment of the first aspect, the power output unit is coupled to a first capacitive element, and/or, an output end of the voltage conversion unit is coupled to a second capacitive element.

In an embodiment of the first aspect, a voltage stabilizing element is further coupled to a coupling point between the voltage conversion unit and the first thermistor unit.

A second aspect of the present disclosure further provides an LED lamp, including an LED light source, and the LED driving circuit described above that is coupled to the LED light source.

In an embodiment of the second aspect, the LED lamp includes a bulb.

In summary, the present disclosure provides an LED driving circuit and an LED lamp. The LED driving circuit includes: a power input unit that is coupled to an input voltage; a voltage conversion unit that is coupled to the power input unit and converts the input voltage into a conversion voltage; a power output unit that is coupled to an LED light source; a first thermistor unit that is connected between the power input unit and the voltage conversion unit, and coupled to the power input unit and the voltage conversion unit respectively; a second thermistor unit that is connected between the voltage conversion unit and the power output unit, and coupled to the voltage conversion unit and the power output unit respectively, where the second thermistor unit and the conversion voltage generates a driving current passing through the LED light source; where the resistance of the first thermistor unit is positively correlated to its sensed temperature, and the resistance of the second thermistor unit is positively correlated to its sensed temperature to stabilize the driving current. The driving circuit ensures a stable luminescence even when the voltage fluctuates, and lengthens the service life of the LED lamp.

DETAILED DESCRIPTION

Figure 1:
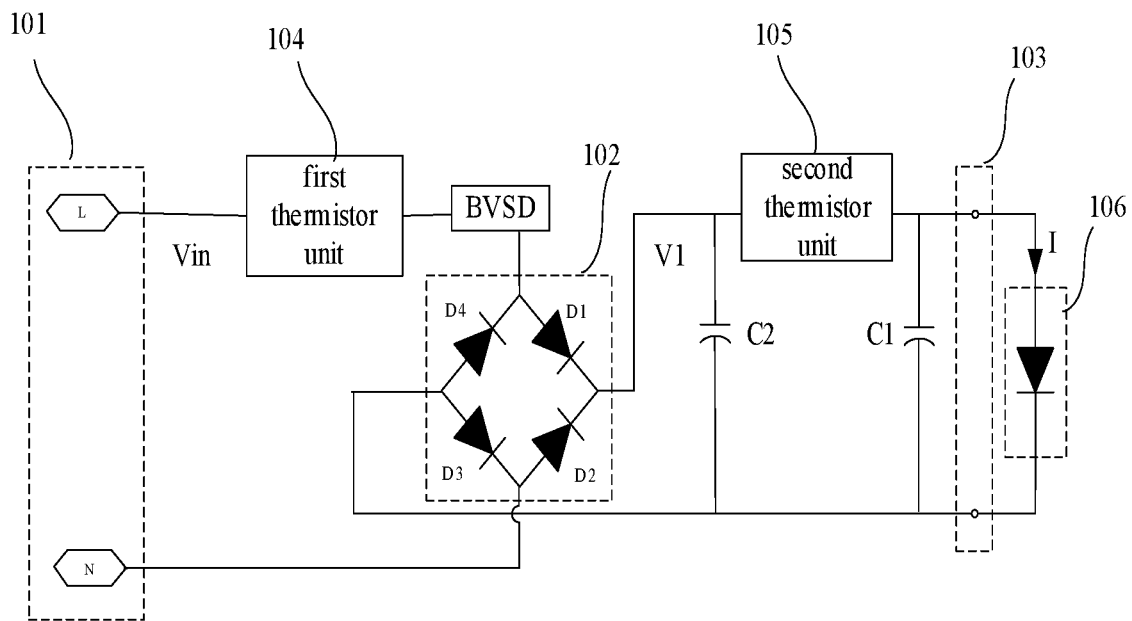
FIG. 1 is a schematic diagram of an LED driving circuit according to an embodiment of the present disclosure.

The embodiments of the present disclosure will be described below through specific examples. Those skilled in the art can easily understand other advantages and effects of the present disclosure according to contents disclosed by the specification. The present disclosure can also be implemented or applied through other different specific embodiments. Various modifications or changes can also be made to all details in the specification based on different points of view and applications without departing from the spirit of the present disclosure. It needs to be stated that the embodiments and the features in the embodiments in the present disclosure can be combined with one another under the situation of no conflict.

The embodiments of the present disclosure are described in detail below with reference to the drawings, so that those skilled in the art can easily implement the present disclosure. The present disclosure can be embodied in a variety of different forms and is not limited to the embodiments described herein.

In order to clarify the present disclosure, components that are not related to the description are omitted, and the same or similar components are denoted by the same reference numerals throughout the specification.

Throughout the specification, when a component is "connected" with another component, this includes not only the "direct connection" but also the "indirect connection" in which other elements are placed between the two components. In addition, when a certain component "includes" or "comprises" a certain element, unless otherwise stated, other elements are not excluded, which means other elements may be included.

When a first component is referred to as being "above" a second component, it may be directly above the second component; however, other components may also be accompanied between the two components. In contrast, when a first component is referred to as being "directly above" a second component, there are no other components between the two components.

Although the terms first, second, etc. are used herein to describe various elements in some embodiments, these elements should not be limited by these terms. These terms are only used to distinguish one element from another. For example, the first terminal and the second terminal. In addition, as used herein, the singular forms "a", "an" and "the" are intended to include the plural forms as well, unless the context clearly indicates otherwise. It should be further understood that the terms "comprise", "include" indicate that there are the described features, steps, operations, elements, components, items, categories, and/or groups, but the existence, appearance, or addition of one or more other features, steps, operations, elements, components, items, categories, and/or groups are not excluded. The terms "or" and "and/or" are used herein to be interpreted as inclusive or meaning any one or any combination. Thus, "A, B or C" or "A, B and/or C" means "any one of the following: A; B; C; A and B; A and C; B and C; A, B, and C". An exception to this definition occurs only when a combination of elements, functions, steps or operations are inherently mutually exclusive in some manner.

The terminology used herein is only for the purpose of the description of special embodiments, and is not intended to limit the present disclosure. The singular form as used herein includes plural forms as long as the statement does not explicitly indicate the opposite. The word "include" used in the specification means the materialization of the specific features, regions, integers, steps, operations, elements, and/or components, and does not exclude the existence or addition of other features, regions, integers, steps, operations, elements and/or components.

Terms referring to relative spaces such as "below", "above", etc. may be used to more easily illustrate the relationship of one component to another component illustrated in the drawings. Such terms refer to not only the meanings indicated in the drawings, but also other meanings or operations of the device in use. For example, a component that is described as "below" other components is described as "above" other components if the device in the drawings is turned over. Therefore, the term "below" is used to include all of the above and under. The device can be rotated by 90° or other angles, and terms representing relative space are also explained accordingly.

Although not defined differently, all terms including the technical terms and scientific terms used herein have the same meaning as commonly understood by those skilled in the technical field to which the present disclosure relates. The terms defined in the commonly used dictionary are additionally interpreted as having meanings consistent with the contents of the related technical documents and the current prompts, and as long as they are not defined, they should not be overly interpreted as ideal or very formulaic meanings.

As described above, due to voltage fluctuation and other reasons of the driving circuit of the LED lamps, the driving current passing through the LED light source becomes unstable which leads to flicker and a reduction of the service life of the LED.

In view of this, thermistors with a positive temperature coefficient (hereinafter, PTC thermistors), whose resistance becomes larger as the temperature increases, are introduced in the embodiment of the present disclosure. Therefore, a voltage fluctuation or the like is converted into a resistance change by the PTC thermistors to compensate and reduce the change of value of the current flowing through the LED light source.

It should be stated that although thermistors have been used in the LED driving circuit in the prior art, they are all used for abnormality protection of the LED light source when the working temperature is too high. In the embodiments of the disclosure, PTC thermistors are innovatively used to stabilize the current flowing through the LED light source when the voltage fluctuates.

The above principle is explained below by a plurality of specific embodiments.

FIG. 1 shows a schematic diagram of an LED driving circuit of the present disclosure.

The LED driving circuit includes a power input unit 101, a voltage conversion unit 102, a power output unit 103, a first thermistor unit 104, and a second thermistor unit 105.

The power input unit 101 is coupled to an input voltage. In some embodiments, the power input unit 101 includes a first terminal and a second terminal, where the first terminal is connected to a live line (L), the second terminal is connected to a neutral line (N), and a potential difference between the neutral line and the live line is an input voltage. Exemplarily, the input voltage may be an alternating current voltage, such as a 110V alternating current voltage used in European and American countries, or a 220V alternating current voltage used in China and some countries. The input voltage may fluctuate in a certain range, for example, when the input voltage is a 110V alternating current, its fluctuation range may be 110V~130V, or when the input voltage is a 220V alternating current, its fluctuation range may be 220V~240V.

The voltage conversion unit 102 is coupled to the power input unit 101 and is adapted to convert the input voltage into a conversion voltage. In some embodiments, the input voltage is an alternating current voltage. The voltage conversion unit 102 may include a rectifier circuit, such as a bridge rectifier circuit as shown in FIG. 1, which is composed of diodes D1, D2, D3, and D4 that are connected, and the rectifier circuit converts the alternating current voltage into a conversion voltage V1 that is a direct current voltage. The conversion voltage V1 is specifically shown as a potential difference between the terminal A and terminal B in FIG. 1.

In other embodiments, the voltage conversion unit 102 may also include a transformer circuit and a rectifier circuit that are connected. The transformer circuit can be arranged before the rectifier circuit to transform the input voltage (such as converting a 220V alternating current into a 110V alternating current, etc.) firstly, and then the rectifier circuit rectifies the output of the transformer circuit into a direct current voltage for output.

The power output unit 103 is coupled to an LED light source 106. The power output unit 103 has two terminals which are respectively coupled to two terminals of the LED light source 106. In some embodiments, the LED light source 106 includes one or more LED diodes, such as a plurality of LED diodes connected in parallel or series, or the like.

The first thermistor unit 104 is arranged between the power input unit 101 and the voltage conversion unit 102, and coupled to the power input unit 101 and the voltage conversion unit 102 respectively. In some embodiments, the resistance of the first thermistor unit 104 is positively correlated to its sensed temperature. Therefore, the first thermistor unit 104 may include at least one PTC thermistor whose resistance is positively correlated to its sensed temperature. The function of the first thermistor unit 104 is to offset, for example, fluctuations of the input voltage. Exemplarily, when the input voltage fluctuates from 110V to 120V, the current flowing through the first thermistor unit 104 will correspondingly increase based on the proportional relationship of U=I*R, and thus the temperature of the first thermistor unit 104 will raise, so that the resistance of the first thermistor unit 104 will increase with the rise of its temperature. As a result, an increase of the input voltage is converted into an increase of the resistance of the first thermistor unit 104, so that the current flowing through the first thermistor unit 104 remains stable.

The second thermistor unit 105 is arranged between the voltage conversion unit 102 and the power output unit 103, and coupled to the voltage conversion unit 102 and the power output unit 103 respectively. The second thermistor unit 105 and the conversion voltage generate a driving current flowing I through the LED light source 106. The resistance of the first thermistor unit 104 is positively correlated to its sensed temperature, and the resistance of the second thermistor unit 105 is also positively correlated to its sensed temperature. In a specific embodiment, an increase of the input voltage leads to an increase of the conversion voltage V1, and thus leads to an increase of the driving current, i.e., the current flowing through the second thermistor unit 105 increases, so that the temperature of the second thermistor unit 105 increases. Accordingly, the resistance of the second thermistor unit 105 increases, which in turn results in a decrease of the driving current I, thereby stabilizing the driving current.

More specifically, in FIG. 1, the equivalent resistance of the first thermistor unit 104 is R1, the equivalent resistance of the second thermistor unit 105 is R2, the input voltage is Vin, the conversion voltage is V1, and the driving current is I. When the voltage that is used to form the AC voltage Vin at the L terminal is greater than that at the N terminal, a loop is formed from the L terminal to the N terminal via R1, D1, R2, the LED light source 106, and D3. Alternatively, when the voltage that is used to form the AC voltage Vin at the N terminal is greater than that at the L terminal, a loop is formed from the N terminal to the L terminal via D2, the LED light source 106, R2, D4, and R1. According to the circuit shown in the figures, it is easy to obtain the relationship of I≈|Vin|/(R1+R2). An increase of Vin causes a rise of the resistance of R1 and R2, because the current flowing through the first thermistor unit 104 and the second thermistor unit 105 raise with the increase of Vin, which leads to increase of their temperature, and as a result I remains stable with no increase. Similarly, a decrease of Vin after an increase causes a decrease of R1 and R2 correspondingly, while I remains stable with no decrease. As can be seen from the above, the driving current I can be kept stable by the characteristics of the first thermistor unit 104 and the second thermistor unit 105. Therefore, the brightness of the LED light source 106 can be kept stable even when the input voltage fluctuates from 110V to 130V or from 220V to 240V.

In addition, the existence of the second thermistor unit 105 also plays a role in limiting the driving current I. For example, if accumulated heat generated by the circuit causes the temperature of the circuit to rise continuously with the voltage remaining stable, the resistance of the second thermistor unit 105 will increase, and thus the driving current I will be reduced, and the load of the LED light source 106 will be adjusted.

In some embodiments, the first thermistor unit 104 includes at least one first thermistor element whose resistance is positively correlated to its sensed temperature. Optionally, a first thermistor element may be a polymeric positive temperature coefficient (PPTC) thermistor, also known as a resettable fuse or a polyfuse. The core of PPTC is made of polymer materials and conductive particles. The principle of PPTC is that the conductive particles among the crystals of polymer form a conductive network that is in a conductive state at low temperatures. When the current passing through the PPTC is too large, the temperature of PPTC increases, the volume expands, and the polymer changes from crystalline state to amorphous state, which breaks the connecting network of conductive particles, thus making it non-conductive or insulating. The main advantages of PPTC thermistor are: zero-power resistance at room temperature can be very small; the resistance is only a few milliohms when the current in a circuit is high, therefore, the power consumption of PPTC thermistor is small and even negligible; and the volume is relatively small. The PPTC thermistor can be used as a fuse when connected in series with some component due to its ability to rapidly change its resistance within several ms, small heat capacity, short recovery time, and satisfactory shock resistance. Therefore, it is more suitable for the first thermistor unit 104 to adopt the PPTC thermistors to handle the access of the input voltage in the circuit as shown in FIG. 1.

Figure 2A:
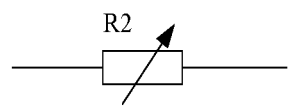
FIGS. 2A-2B are circuit schematic diagrams of a first thermistor unit in some embodiments of the present disclosure.
Figure 2B:
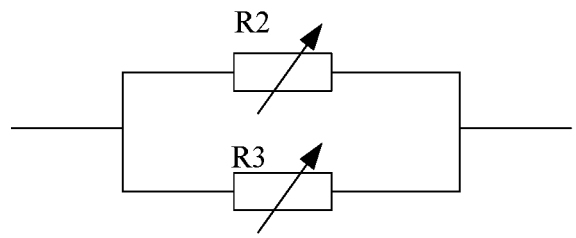

In some embodiments, the first thermistor unit 104 may include only one first thermistor element as shown in FIG. 2A. Alternatively, in some other embodiments, the first thermistor unit 104 may include a plurality of first thermistor elements that are connected in series and/or in parallel. For example, as shown in FIG. 2B, when the first thermistor unit is composed of two first thermistor elements each with a resistance of R3 that are connected in parallel, the equivalent resistance of the first thermistor unit is R3*R3/2R3=R3/2, and the variation range of the resistance of the first thermistor unit is reduced compared with that of a first thermistor unit that is composed of one first thermistor element with a resistance of R3. When a plurality of first thermistor elements are connected in series, such as two R3 are connected in series, the equivalent resistance is 2R3, and the variation range of the resistance is increased. Therefore, the implementation of the first thermistor unit can be determined depending on the actual situation, and employs a plurality of first thermistor elements that are either connected in parallel or in series.

In some embodiments, the second thermistor unit 105 may include a combination of resistors which include at least one second thermistor element and thermistor elements or non-thermistor elements that are connected in parallel with the second thermistor element, where the resistance of the second thermistor element is positively correlated to its sensed temperature, i.e., the second thermistor element is a PPTC thermistor.

Figure 3A:
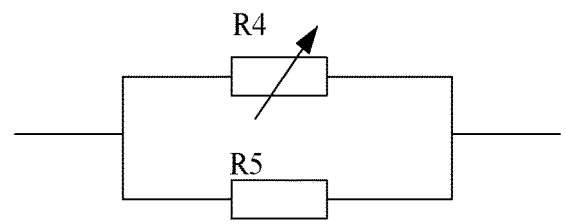
FIGS. 3A-3F are circuit schematic diagrams of a second thermistor unit in some embodiments of the present disclosure.

FIG. 3A is a schematic diagram of the combination of resistors of the present disclosure.

The second thermistor unit includes a second thermistor element R4 and a non-thermistor element R5 that are connected in parallel. Correspondingly, the equivalent resistance is R4*R5/(R4+R5), where R5 remains unchanged, and R4 increases with an increase in temperature. Compared with R4 alone, the magnitude of variation of R4*R5/(R4+R5) when R4 varies is smaller than that of R4, which can further mitigate the variation of driving current I.

Figure 3B:
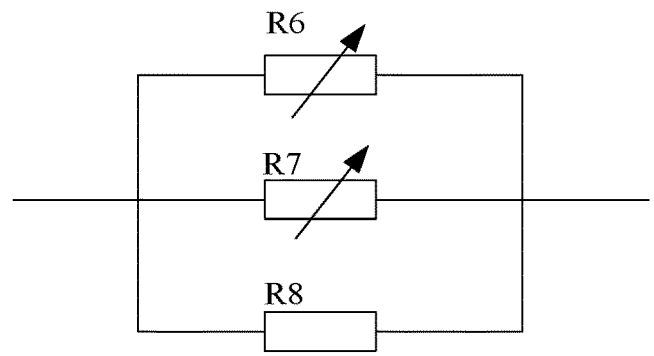

Of course, the second thermistor unit may include a plurality of second thermistors, as shown in FIG. 3B, and the second thermistor unit is composed of two second thermistors R6, R7, and a non-thermistor element R8 that are all connected in parallel. Similarly, the second thermistor unit may include a plurality of non-thermistor elements.

Figure 3C:
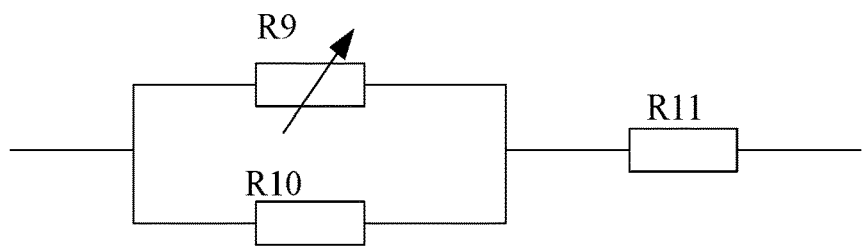

In other embodiments, the resistors may also be connected in series, or connected in series and parallel. As shown in FIG. 3C, the combination of resistors includes a second thermistor element R9 and a non-thermistor element R10 that are connected in parallel, and a non-thermistor element R11 that is connected in series with R9 and R10.

Figure 3D:
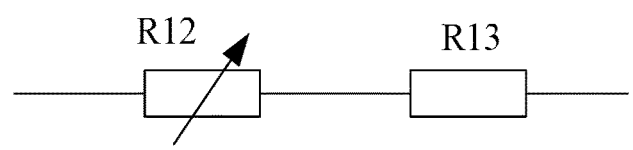

As further illustrated in FIG. 3D, the combination of resistors may include a second thermistor element R12 and a non-thermistor element R13 that are connected in series with an equivalent resistance of R12+R13. A rate of change of R12+R13 caused by the variation of R12 in the combination of resistors of the present disclosure is lower than that of R12 alone caused by the variation of R12, and R12+R13 is greater than R12, so that the combination of resistors can be applied in scenarios where fluctuations of the driving current need to be smoothed out and relatively mitigated.

Figure 3E:
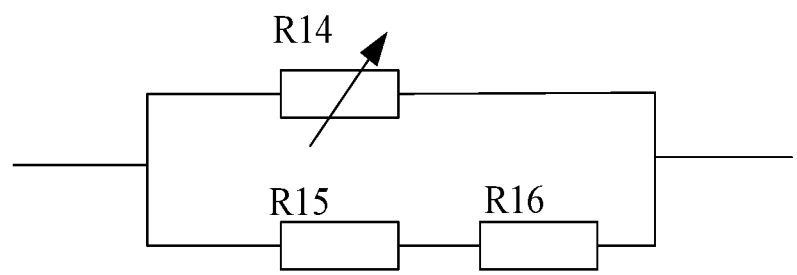

As further illustrated in FIG. 3E, the combination of resistors may include a second thermistor element R14, a second thermistor element R15, and a non-thermistor element R16, where R15 and R16 are in a first branch and are connected in series, and then R15 and R16 are connected in parallel with R14 that is in a second branch. An equivalent resistance of the combination of resistors is R14*(R15+R16)/R14+R15+R16, and the resistance of R14 and R15 both vary with their respective sensed temperatures. The combination of resistors when connected in such a way can be applied to scenarios where fluctuations of the driving current need to be smoothed out.

Figure 3F:
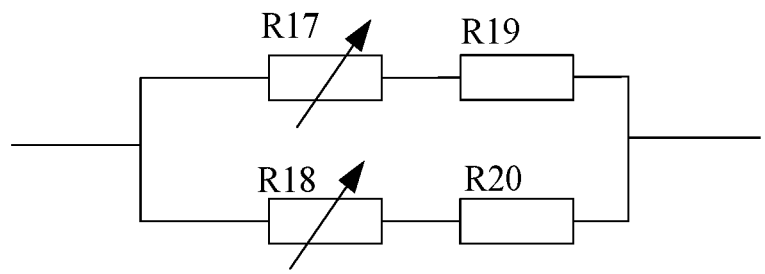

As further illustrated in FIG. 3F, the combination of resistors may include second thermistor elements R17 and R18, and non-thermistor elements R19 and R20, where R17 and R19 are in a first branch and are connected in series, and then R17 and R19 are connected in parallel with R18 and R20 that are in a second branch. The combination of resistors when connected in such a way can be applied to scenarios where fluctuations of the driving current need to be smoothed out.

Various implementations of the combination of resistors in the second thermistor unit illustrated in FIGS. 3A to 3F may be selected according to different scenarios where the driving current of the LED light source needs to be stabilized, and are not limited to the above-described manner.

In some embodiments, the second thermistor unit includes at least one second thermistor element that is a ceramic positive temperature coefficient (CPTC) thermistor. CPTC thermistors have the following characteristics: a resistance ranging from tens to thousands ohms, relatively slow resistance change which may take up to several hundred ms, large heat capacity, and a long time to return to its typical resistance, so that it is more suitable to arrange the CPTC thermistor on the side of the LED light source in FIG. 1 to limit the change of the driving current of the LED light source.

Referring to FIG. 1 again, in some alternative embodiments, a voltage stabilizing element is also coupled to the coupling point between the voltage conversion unit and the first thermistor unit to stabilize the voltage which is an output after the input voltage is applied to the first thermistor. The voltage regulator may be a bidirectional voltage stabilizing diode to cope with the situation where the input voltage is an alternating current voltage.

In some alternative embodiments, in order to reduce the interference of the AC signal of the conversion voltage obtained by an AC/DC conversion, the power output unit is coupled to a first capacitive element C1, which is connected in parallel to the LED light source and play a role in filtering the AC signal. Optionally, a co-connection point between the voltage conversion unit and the second thermistor unit may be coupled to a second capacitive element C2 to filter the AC signal.

Figure 4:
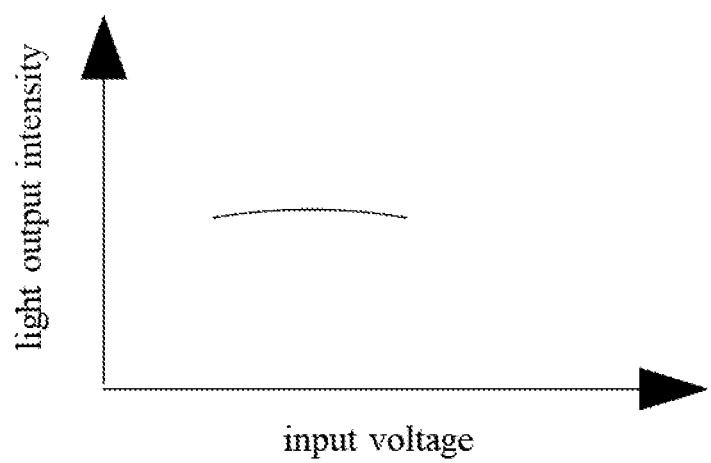
FIG. 4 is a schematic diagram of simulation results of an LED driving circuit according to an embodiment of the present disclosure.

FIG. 4 is a schematic diagram of the simulation results of the LED driving circuit of the present disclosure.

In this schematic diagram, the relationship between the light output intensity of the LED light source and the input voltage is shown. It can be found that the light output intensity remains stable with a variation of the input voltage, and thus proving that the LED driving circuit in the present disclosure can effectively stabilize the driving current even when the voltage fluctuates, thereby ensuring a stable luminescence and lengthening the service life of an LED lamp.

The present disclosure also provides an LED lamp, which includes an LED light source, and the LED driving circuit described above that is coupled to the LED light source.

Figure 5:
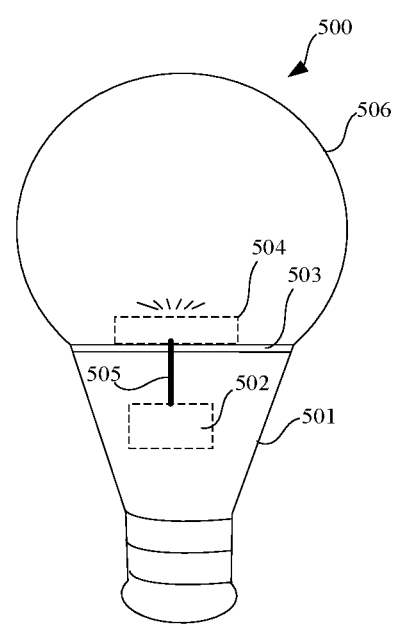
FIG. 5 is a schematic diagram of an LED lamp according to an embodiment of the present disclosure.

In some embodiments, the LED lamp includes a bulb 500. For example, as shown in FIG. 5, the bulb includes: a radiator 501, a power supply cavity for arranging the LED driving circuit 502, a spacer 503, and a light shield 506, where an upper end of the power supply cavity is an opening, and a lower end of the power supply cavity is connected with a lamp holder; where the spacer 503 is connected with the opening at the upper end of the power supply cavity for carrying a circuit board of the LED light source 504, the LED light source 504 and the LED driving circuit 502 are electrically connected via a conductor line 505; and the light shield 506 is arranged outside of the LED light source 504 to form a light emitting cavity of the LED light source 504.

The bulb can be widely used in various scenarios. The LED driving circuit in the present disclosure is used to stabilize the driving current passing through the LED light source, so that a stable luminescence and a long service life of the LED light source can be obtained, and thus providing a good user experience.

The LED lamp is merely exemplarily a bulb, and the LED lamp may also be various kinds of lamps, such as spotlight, downlight, lamp cup, candle lamp, corn lamp, and the like, and is not limited to the above.

To sum up, the present disclosure provides an LED driving circuit and an LED lamp. The driving circuit includes: a power input unit which is coupled to an input voltage; a voltage conversion unit which is coupled to the power input unit and converts the input voltage into a conversion voltage; a power output unit which is coupled to an LED light source; a first thermistor unit which is connected between the power input unit and the voltage conversion unit, and coupled to the power input unit and the voltage conversion unit respectively; a second thermistor unit which is connected between the voltage conversion unit and the power output unit, and coupled to the voltage conversion unit and the power output unit respectively, where the second thermistor unit and the conversion voltage generates a driving current passing through the LED light source. The resistance of the first thermistor unit is positively correlated to its sensed temperature, and the resistance of the second thermistor unit is positively correlated to its sensed temperature, so that the driving current can remain stable, and thus a stable luminescence can be obtained even when the voltage fluctuates, and a long service life of the LED lamp can be guaranteed.

The above-mentioned embodiments are merely illustrative of the principle and effects of the present disclosure instead of limiting the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. An LED driving circuit, comprising:
    a power input unit that is coupled to an input voltage;
    a voltage conversion unit that is coupled to the power input unit and converts the input voltage into a conversion voltage;
    a power output unit that is coupled to an LED light source, wherein the power output unit is further coupled to a first capacitive element, which is connected in parallel with the LED light source;
    a first thermistor unit that is connected between the power input unit and the voltage conversion unit, and coupled to the power input unit and the voltage conversion unit respectively; and
    a second thermistor unit that is connected between the voltage conversion unit and the power output unit, and coupled to the voltage conversion unit and the power output unit respectively, wherein the second thermistor unit and the conversion voltage generates a driving current passing through the LED light source;
    wherein the resistance of the first thermistor unit is positively correlated to its sensed temperature, and the resistance of the second thermistor unit is positively correlated to its sensed temperature to stabilize the value of the driving current,
    wherein a co-connection point between the voltage conversion unit and the second thermistor unit is coupled to a second capacitive element.

2. The LED driving circuit according to claim 1, wherein the first thermistor unit comprises at least one first thermistor element, whose resistance is positively correlated to its sensed temperature.

3. The LED driving circuit according to claim 2, wherein the first thermistor unit comprises a plurality of first thermistor elements that are connected in series and/or in parallel.

4. The LED driving circuit according to claim 3, wherein each first thermistor element is a polymeric positive temperature coefficient thermistor.

5. The LED driving circuit according to claim 2, wherein each first thermistor element is a polymeric positive temperature coefficient thermistor.

6. The LED driving circuit according to claim 1, wherein the second thermistor unit comprises a combination of resistors,
    wherein the combination of resistors comprises at least one second thermistor element and thermistor elements or non-thermistor elements that are connected in parallel with the second thermistor elements, and the resistance of the second thermistor element is positively correlated to its sensed temperature.

7. The LED driving circuit according to claim 6, wherein each second thermistor element in the second thermistor unit is a ceramic positive temperature coefficient thermistor.

8. The LED driving circuit according to claim 1, wherein the second thermistor unit comprises a plurality of second thermistor elements that are connected in series and/or in parallel, wherein the resistance of each second thermistor element is positively correlated to its sensed temperature.

9. The LED driving circuit according to claim 8, wherein each second thermistor element in the second thermistor unit is a ceramic positive temperature coefficient thermistor.

10. The LED driving circuit according to claim 1, wherein the voltage conversion unit comprises a rectifier circuit.

11. The LED driving circuit according to claim 10, wherein the rectifier circuit is a bridge rectifier circuit.

12. The LED driving circuit according to claim 1, wherein the input voltage is an alternating current voltage, and the voltage conversion unit comprises a rectifier circuit.

13. The LED driving circuit according to claim 1, wherein a bidirectional voltage stabilizing diode (BVSD) is further coupled to a coupling point between the voltage conversion unit and the first thermistor unit.

14. An LED lamp, comprising:
    an LED light source,
    and the LED driving circuit according to claim 1 is coupled to the LED light source.

15. The LED lamp according to claim 14, wherein the LED lamp comprises a bulb.

* * * * *